Figure 1:
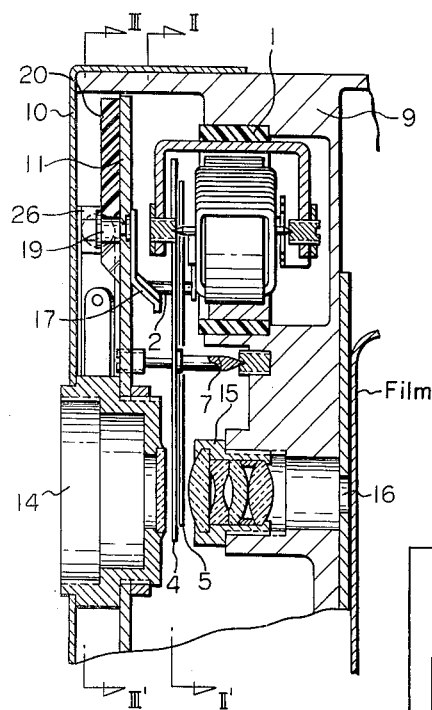

Feb. 15, 1966  KOJI SHO ET AL  3,234,867
MOTION PICTURE CAMERA
Filed Sept. 20, 1963

INVENTORS
K. SHO, Y. IIDA AND Y. KASUYAMA
BY
ATTORNEY

United States Patent Office 3,234,867
Patented Feb. 15, 1966

3,234,867
MOTION PICTURE CAMERA
Koji Sho, Tsurumi-ku, Yokohama-shi, Yozo Iida, Kitatama-gun, Tokyo-to, and Yoshihisa Katsuyama, Totsuka-ku, Yokohama-shi, Japan, assignors to Nippon Kogaku K.K., Tokyo, Japan, a corporation of Japan
Filed Sept. 20, 1963, Ser. No. 310,404
Claims priority, application Japan, Oct. 23, 1962, 37/45,974
4 Claims. (Cl. 95—64)

This invention relates to a manually operable switching mechanism of the automatic diaphragm aperture adjustment mechanism of motion picture cameras, particularly 8 mm. motion picture cameras.

Prior known in this field are mechanisms to obtain manually an optional diaphragm aperture size by giving the galvanometer the characteristic of returning to its zero displacement position when the circuit connected to the galvanometer is opened and rotating the moving coil of the galvanometer in the direction opposite to said zero-returning characteristics of the galvanometer through the use of a manual diaphragm operating member. In such mechanisms, it is also known that the switch for opening the circuit of the galvanometer be operable independently of the manual diaphragm operating member or that the switch for opening said circuit be operable in interlocking relation with the manual diaphragm operating member. However, the former type lacks relevancy between the two elements and the latter type lacks independency, in other words, an undesired movement of the one element will directly reflect on the remaining element because of the interlocking relationship of the two elements.

With a view to removing such defects, the present invention provides a lock-up means for preventing the manual diaphragm operating member from unexpected action in such fashion that the galvanometer circuit is not opened unless the lock-up means be unlocked, while it is opened in interlocking with the unlocking action and the unlocking action itself is utilized in checking the voltage of the electrical source of the circuit.

Figure 2:
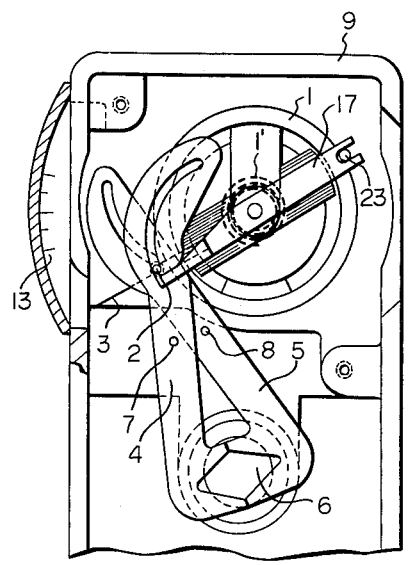
Figure 5:
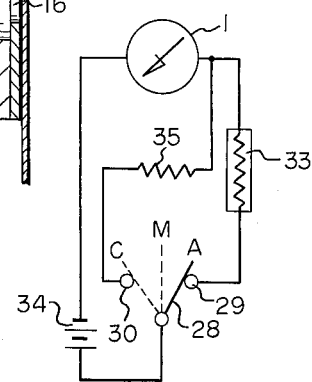
Figure 3:
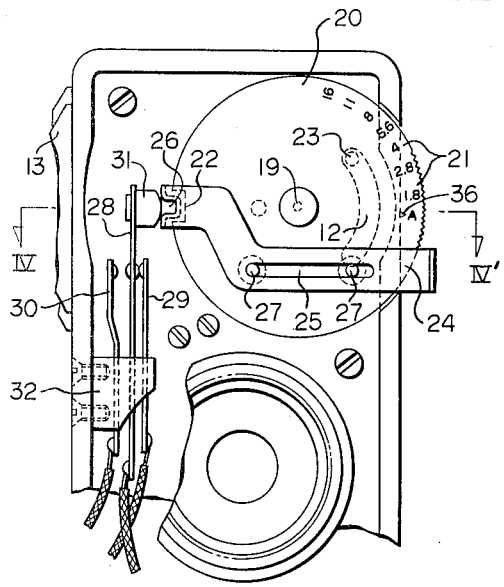
Figure 4:
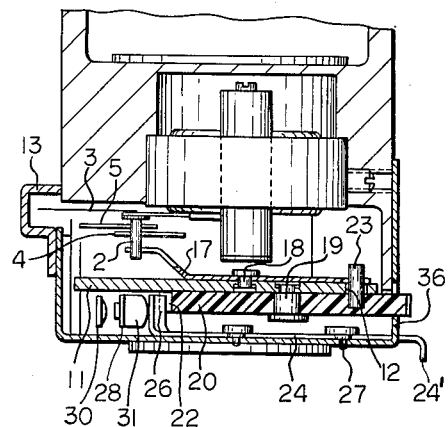

The present invention will be explained in detail with reference being made to the drawing, in which:

FIGURES 1 and 2 show an illustrative embodiment of our automatic diaphragm operation mechanism comprising diaphragm blades with cam slots provided therein, respectively, and a galvanometer of an 8 mm. motion picture camera; FIGURE 2 being a view taken along line II—II' of FIGURE 1;

FIGURES 3 and 4 are a plan and a sectional view, respectively, of the manually operable switching mechanism according to the invention assembled with the camera shown in FIGURES 1 and 2, FIGURE 3 being a view taken along line III—III' of FIGURE 1 and FIGURE 4 a view taken along line IV—IV' of FIGURE 3; and FIGURE 5 is a diagram of the circuit for the automatic diaphragm operation mechanism and the manually operable switching mechanism in accordance with the invention.

Referring to FIGURES 1 and 2, which illustrate the automatic diaphragm operation mechanism as described in our pending U.S. application S.N. 94,334, element 1 is a galvanometer having hair spring 1', guide pin 2 and indicator 3. Elements 4 and 5 are diaphragm blades for the objective system, each blade having a cam arcuate slot in which guide pin 2 is slidable, and arranged so as to give a desired size of diaphragm aperture 6 by moving about fixed axial pins 7 and 8, respectively, in response to the displacement of guide pin 2. Elements 9, 10 and 11 are different sections of the camera body and serve as bases for various elements of the mechanism in accordance with the invention. Element 13 is a graduated scale for indicating magnitude of the angle of rotation of indicator 3 corresponding to the exposure value, and is made of a transparent material enabling reading of the scale externally of the camera. Elements 14 and 15 are mounts for the objective lenses. Element 16 is an image aperture, behind which the photographic film is positioned. To facilitate the understanding of the inventive mechanism, the other essentail portions of the motion picture camera are not shown in the figures of the drawing.

Referring particularly to FIGURES 2 and 4, a lever 17 is arranged for rotation about axial pin 18 fixed to the section 11 of the camera body and engages with pin 23 mounted in and extending from dial 20 which rotates about axial pin 19, and which, on rotation of dial 20, shifts guide pin 2, opposing the zero-returning characteristic of the galvanometer within the range limited by the arcuate guide slot 12 in position 11 of the camera body.

Referring to FIGURE 3, safety means 24 mounted to camera body 10 with pins 27 may slidably shift within the range restricted by guide slots 25 provided therein, the bent inner end 26 of safety means 24 being engageable with recess 22 of dial 20 which thereby is stopped at a definite position; and the dial may not be rotated unless inner end 26 is disengaged from dial recess 22 by pushing the externally projecting end 24' of the lever 24 in opposition to the biasing force of leaf spring 28. Furthermore, safety lever 24 functions as an interlocking means with the switching means as hereinafter described. Elements 28, 29 and 30 are components of the switching means having an electrically neutral point M as illustrated in FIGURE 5. Leaf spring 28 presses against previously mentioned lever 24 through an insulating piece 31 and maintains electrical contact with terminal 29, and is so arranged that, upon release of end 26 of safety lever 24 from recess 22 and rotation of dial 20, inner end 26 being kept contact with the periphery of dial 20, breaks contact with terminal 29 and, still making no contact with terminal 30, may occupy the neutral position designated M in FIGURE 5. Guide slot 25 is so designed to permit safety means 24 to shift and function to enable spring 28 to have electrical contact either with terminal 29 or terminal 30. Insulated piece 32, secured to camera body 9, holds contact terminals 29 and 30 and spring contact 28 apart from one another.

FIGURE 5 diagrammatically illustrates the preferred circuit for the automatic diaphragm operation device and the switching mechanism in accordance wtih the invention. Photoresistive element 33, battery 34 and fixed resistor 35, are housed in a section of the camera body unillustrated in FIGURES 1 to 4, and interconnected with one another to carry out the specifiic functions as illustrated in FIGURE 5.

For the mechanism to act as an automatic diaphragm operating means, the inner end 26 of lever 24 is locked with recess 22 of dial 20, the latter held under the control of the safety means as shown in FIG. 3, contacts 28 and 29 engaging each other as shown in position A of FIG. 5, the circuit thereby being closed. Thus guide pin 2 integral with galvanometer 1 automatically moves to a predetermined position by the action of photoresistivity element 33 and gives a responsive aperture size 6 in accordance with the rotation of diaphragm blades 4 and 5.

If the mechanism be switched to manual operation, it is necessary to push lever 24 to the left in FIG. 3 to disengage bent inner portion 26 of safety means 24 from recess 22 of dial 20 thereby positioning contact 28 in its electrically neutral position M (FIG. 5), then manually to rotate dial 20 to set it at a predetermined position through the use of index mark 36 provided on the camera body in conjunction with the exposure valve row 21 engraved on dial 20. In this operation, guide pin 2 is moved while maintained compulsorily in contacting relation with lever 17 by the mechanical energy produced by the spiral hair spring used for returning the galvanometer coil to its zero displacement position. By so doing the size of aperture 6 is fixed at a predetermined magnitude without rambling. Upon dial 20 being returned to its original (i.e., with inner end 26 in recess 22) relative position, contact element 28 springs back to restore the control catch of safety means 24 and the function of the automatic diaphragm operation system.

Checking of the source voltage is made in the following manner. Upon safety means 24 being sufficiently shifted to a position as electrically engages contact element 28 with terminal 30 irrespective of the position of dial 20, the circuit through C of FIGURE 5 is closed to rotate indicator 3 of galvanometer 1 to a position determined by cell 34 and fixed resistance 35, thus rendering it possible to read the actual voltage of cell 34 through the medium of scale 13. Upon release of lever 24, contact element 28 instantly restores back to condition A or M of FIGURE 5.

In accordance with the invention, the safety means always locks up the dial when the mechanism is automatically operated, and the dial can not be expectedly moved. Merely unlocking the safety means by the inwardly manual pushing thereof results in opening the circuit for automatic operation and in producing the condition of manual operation, while further inward manual pushing of the safety means closes the circuit for checking the voltage of the electrical cell. It will be readily noted, therefore, that the operations (a) to check the voltage of the source, and (b) to open the aperture to maximum size for focusing the image, are both simply obtained. In addition, the mechanism according to this invention is so simple that it is easily built into a compact camera body.

It is, of course, to be understood that the specification and drawing are illustrative, and not in any way limitative of the instant invention.

What we claim is:

1. In a camera having exposure diaphragm blades operable to variable exposure openings,
    means for manually controlling the aperture opening of the diaphragm blades,
    means for automatically controlling the aperture opening of the diaphragm blades,
        the manual aperture controlling means including a slide positionable selectively from externally the camera to one of three positions and a manually rotatable member,
        the automatic aperture controlling means including the rotatable coil of a galvanometer, a voltage source and a photoresistor connected in an electric circuit,
    a fixed resistor serially connected in a parallel circuit connectable to the coil of the galvanometer and the voltage source,
    and a switching means selectively positionable by the slide to a first position in which the circuit of the automatic aperture controlling means is operatively closed while the manual aperture controlling means is locked against movement mechanically by the slide, to a second position in which the manually rotatable member is unlatched from the slide while the automatic aperture control means circuit is opened, and a third position in which both aperture control means are inoperative and the fixed resistor, the coil of the galvanometer and the voltage source are connected in the parallel circuit to measure the voltage value of the source.

2. The motion picture camera according to claim 1 in which
    the manually rotatable member is a disc journalled at its center with a portion of its peripheral region extending externally of the camera,
    a recess in the peripheral region of the disc, and
    the inner end region of the slide is pretensioned against the surface of the disc and adapted to engage the recess when the outer end region of the slide extends a maximum externally of the camera and position the switching means in its first position.

3. The motion picture camera according to claim 1 in which the switching means comprises
    a movable contact on a leaf spring between two fixed contacts normally biased to engage the first of the fixed contacts,
    the first fixed contact is connected to the photoresistor,
    the second fixed contact is connected to the fixed resistor, and
    the movable contact is electrically connected to the voltage source and the coil of the galvanometer and mechanically selectably movable a predetermined amount by the slide to disengage the first fixed contact and a amount greater than the predetermined amount to engage the second fixed contact.

4. A motion picture camera having a manually operative switching means for selectively changing from automatic to manual operation of the aperture diaphragm blades, comprising
    an automatic diaphragm operating means provided by an electrical control circuit including a galvanometer, a photoresistive element, an electric cell, and adjustable diaphragms associated with the galvanometer for varying the exposure aperture,
    a first switching element in the automatic control circuit for setting the adjustable diaphragms to the condition of manual operation,
    a manual diaphragm operating member associated with the diaphragms for enabling manual adjustment of the diaphragms,
    a second switching element,
    the photoresistive element and the first switching element being connected in parallel to a fixed resistor and the second switching element to constitute together with the cell and the galvanometer a circuit for checking the voltage of the cell,
    a locking member for locking as a safety means the manual diaphragm operating member, the locking member being associated with both the first and second switching elements, the first manual operating step of the locking member releasing the locking engagement of the manual diaphragm operating member with the locking member and actuating the first switching element to open the automatic control circuit and the second manual operating step following a first operating manual step actuating the second switching element to close the checking circuit, and
    the first and second switching elements constitute a unitary three-position contact switch, the central contact of the switch being a movable contact mounted on a leaf spring and normally contacting one of the two other contacts of which one is connected to the photoresistive element and the other connected to the fixed resistor, and the leaf spring of the central contact is connected to the cell and the galvanometer and is mechanically associated with one end of the locking member.

References Cited by the Examiner

UNITED STATES PATENTS 3,072,028   1/1963   Lange _____ 95—10
3,156,171   11/1964  Sakaki _____ 95—10

FOREIGN PATENTS 1,235,184   5/1960   France.
1,238,019   6/1960   France.

OTHER REFERENCES

Thiele, German application 1,056,470, Apr. 30, 1959.
Bauer, German application 1,085,418, July 14, 1960.

NORTON ANSHER, *Primary Examiner.*